United States Patent

Ikezawa et al.

[11] Patent Number: 6,145,989
[45] Date of Patent: Nov. 14, 2000

[54] LENS METER

[75] Inventors: Yukio Ikezawa; Eiichi Yanagi; Takeyuki Kato, all of Tokyo, Japan

[73] Assignee: Kabushiki Kaisha TOPCOM, Tokyo, Japan

[21] Appl. No.: 09/402,480
[22] PCT Filed: Feb. 10, 1999
[86] PCT No.: PCT/JP99/00577
§ 371 Date: Nov. 16, 1999
§ 102(e) Date: Nov. 16, 1999
[87] PCT Pub. No.: WO99/41582
PCT Pub. Date: Aug. 19, 1999

[30] Foreign Application Priority Data

Feb. 13, 1998 [JP] Japan ................................. 10-030876

[51] Int. Cl.[7] .................................................... A61B 3/10
[52] U.S. Cl. ............................................................. 351/216
[58] Field of Search .................................... 351/200, 205, 351/211, 212, 216, 217, 218, 246, 247

[56] References Cited

U.S. PATENT DOCUMENTS 4,588,270   5/1986   Hiroshi ..................................... 351/212

Primary Examiner—George Manuel
Attorney, Agent, or Firm—Oblon, Spivak, McClelland, Maier & Neustadt, P.C.

[57] ABSTRACT

A lens meter having a projection system (5) provided with a projection light source (7) adapted to project a measuring beam onto a lens (14) to be examined, and a light receiving system (6) provided with a light receiving element (15) adapted to receive the measuring beam which has passed through the test lens (14), the optical characteristics of the test lens (14) being determined on the basis of a position in which the light receiving element (15) receives the measuring beam which has passed through the test lens, comprising a test lens turning mechanism (16) adapted to turn the test lens (14) around a center (0) of a turning movement corresponding to that of a turning movement of an eyeball in a spectacle lens-worn state.

13 Claims, 16 Drawing Sheets

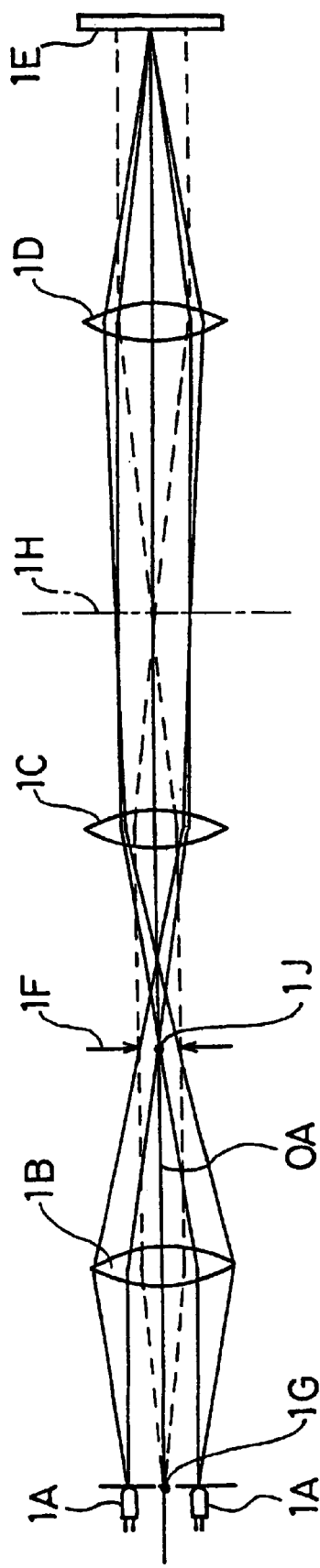
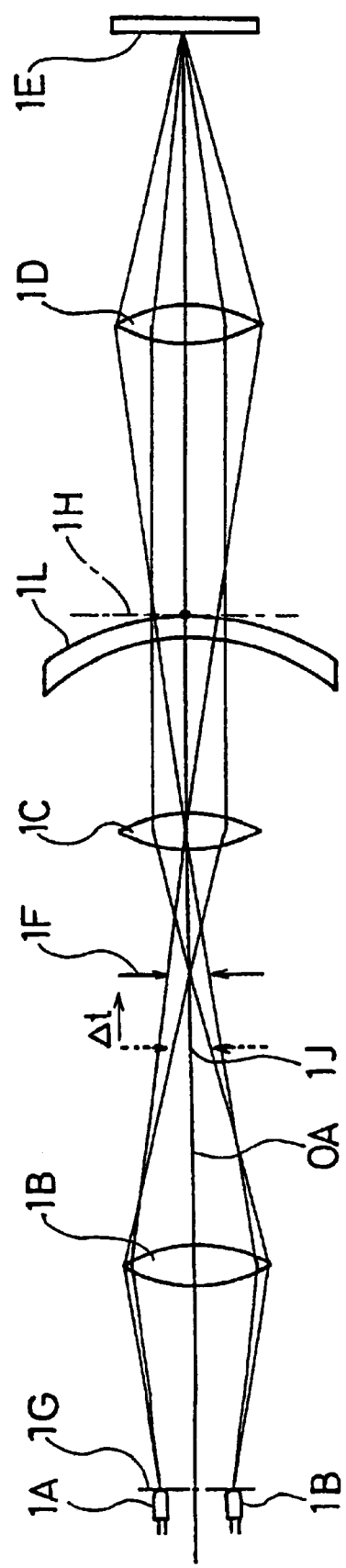
FIG. 3A
FIG. 3B

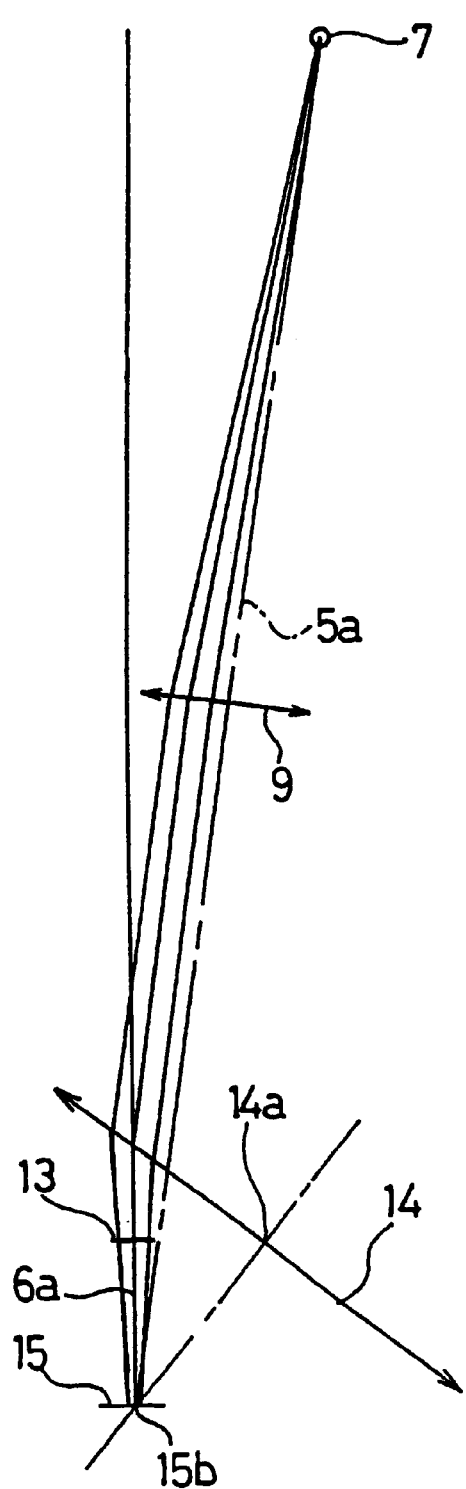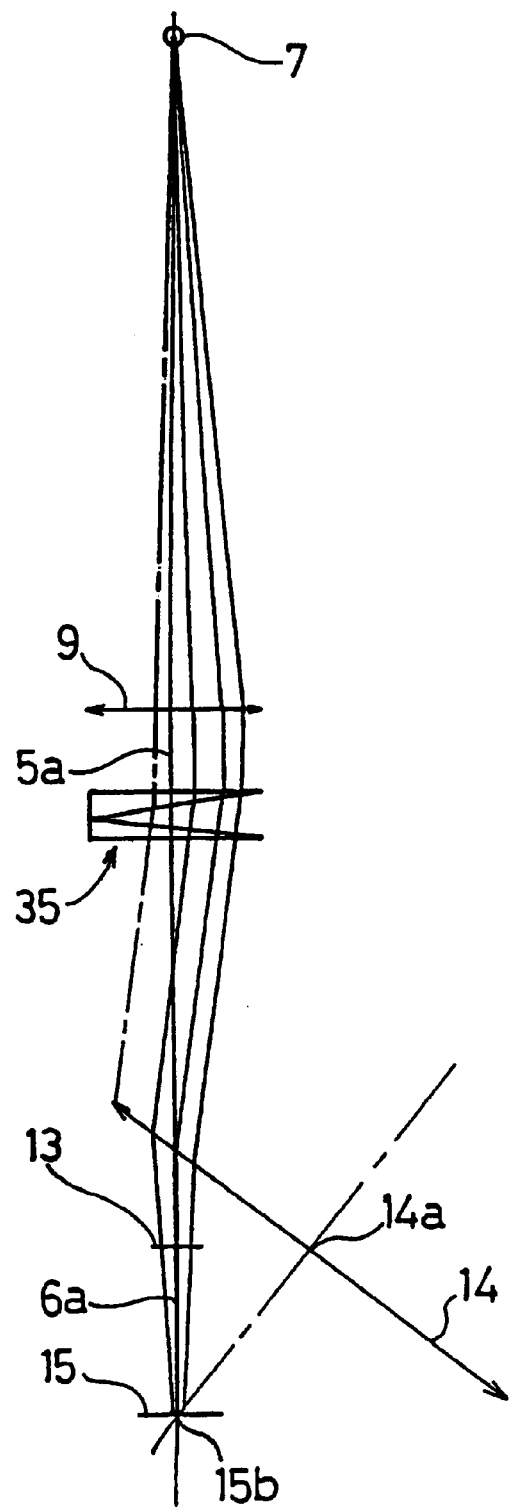
*FIG. 17A*  *FIG. 17B*

LENS METER

TECHNICAL FIELD

The present invention relates to a lens meter capable of turning a lens to be tested, or a test lens, around a center of a turning movement corresponding to that of a turning movement of an eyeball in a spectacle lens-worn state.

BACKGROUND ART

Heretofore there has been known a lens meter provided with a projection light source for projecting a measuring beam onto a test lens and a light receiving element for receiving the measuring beam which has passed through the test lens, the lens meter measuring optical characteristics of the test lens on the basis of a position in which the light receiving element receives the measuring beam after passage through the test lens.

According to this conventional lens meter, with the test lens set in a lens receptacle, the measuring beam is projected onto the test lens and optical characteristics of the test lens such as spherical degree S, cylindrical degree C, axial angle A, and prism quantity Pr, at central and peripheral portions of the test lens are measured.

In this conventional lens meter, when optical characteristics are to be measured at the peripheral portion other than the central portion of the test lens, the test lens is moved while allowing the back of the lens to follow the lens receptacle.

In this connection, consideration will now be given about a spectacle lens-worn state. As shown in FIG. 1, when a person tries to see far, the man mainly uses a light ray P1 which passes through a central position of a spectacle lens 1, but for seeing near, the person uses a light ray P2 which passes through a peripheral position of the spectacle lens 1 and the light ray incident on the lens 1 is oblique to a back 1a of the spectacle lens 1. In FIG. 1 being referred to, the reference numeral 2 denotes an eyeball and the reference mark OL denotes a center of a turning movement of the eyeball 2.

In the conventional lens meter, as shown in FIG. 2, a test lens 3 is measured at a peripheral position thereof while allowing a back 3a of the lens to follow a lens receptacle 4. Thus, optical characteristics of the test lens 3 are measured at a peripheral position under the condition that a measuring beam P3 is incident perpendicularly to the back 3a of the lens 3. Therefore, the optical characteristics measured at a peripheral position of the test lens 3 by the conventional lens meter are not always considered to reflect an actual spectacle lens-worn state.

Particularly, today, with the advent of an aging society, the use of a progressive multi-focus lens is increasing, and in spectacle shops the opportunity of measuring optical characteristics of a progressive multi-focus lens is increasing. In the progressive multi-focus lens, the measurement is made for at least a far-sight portion and a near-sight portion and it is necessary that optical characteristics of the test lens 3 be measured at various positions. However, if the way of light ray passage in an actual spectacle lens-worn state and the way of light ray passage in the measurement using the conventional lens meter are different from each other, it is difficult to exactly evaluate optical characteristics of the progressive multi-focus lens.

There has been proposed a construction in which a turning bench adapted to turn around a center of a turning movement of an eyeball is attached to a lens meter different in measurement principle from the above lens meter.

FIG. 3 shows an example of an optical system in such a lens meter. In the same figure, the reference numeral 1A denotes an LED as a projection light source for the projection of a measuring light beam, 1B denotes a projection lens, 1C denotes a relay lens, 1D denotes a light receiving lens, and 1E a light receiving element, with a measurement target 1F being disposed between the projection lens 1B and the relay lens 1C. For example, four LEDs 1A are disposed around a measuring optical axis OA. A disposed plane 1G of the LED 1A and a disposed position 1H of the test lens are conjugate with respect to the projection lens 1B and the relay lens 1C. The measurement target 1F and the light receiving element 1E are conjugate with respect to the light receiving lens 1D when the test lens 1L is not disposed in the position 1H. As shown in FIG. 3(a), a measuring beam which passes through a hole formed in the measurement target 1F converges to a single spot on a light receiving surface of the light receiving element 1E.

When the measurement target 1F lies in a reference position 1J shown in FIG. 3(a), if the test lens 1L is set to its disposed position and a measuring beam is projected onto the test lens 1L from a back side (the side which faces an eye in a spectacle lens-worn state), there occurs a deviation in the conjugate relation between the measurement target 1F and the light receiving lens 1D.

In the conventional lens meter, for eliminating this inconvenience, as shown in FIG. 3(b), the measurement target 1F is moved along the measuring optical axis OA so that the measurement target 1F and the light receiving element 1E become conjugate, and optical characteristics are measured on the basis of the amount of movement Δt of the measurement target 1F. In this lens meter of an old type, however, not only the optical path of the optical system is long, but also the structure is complicated because a turning bench is attached to the lens meter.

It is an object of the present invention to provide a lens meter of a simple structure capable of measuring optical characteristics which reflect a spectacle lens-worn state to the utmost extent.

DISCLOSURE OF INVENTION

In claim 1 there is described a lens meter including a projection system provided with a projection light source adapted to project a measuring beam onto a lens to be tested, or a test lens, and a light receiving system provided with a light receiving element adapted to receive the measuring light beam which has passed through the test lens, optical characteristics of the test lens being determined on the basis of a position in which the light receiving element receives the measuring beam which has passed through the test lens, the lens meter further including a test lens turning mechanism adapted to turn the test lens around a center of a turning movement corresponding to that of a turning movement of an eyeball in a spectacle lens-worn state.

In claim 2 there is described a lens meter including a projection system provided with a projection light source adapted to project a measuring beam onto a lens to be tested, or a test lens, and a light receiving system provided with a light receiving element adapted to receive the measuring beam which has passed through the test lens, optical characteristics of the test lens being determined on the basis of a position in which the light receiving element receives the measuring beam which has passed through the test lens, the lens meter further including a test lens holding mechanism adapted to hold the test lens and turn the test lens around a center of a turning movement corresponding to that of a turning movement of an eyeball in a spectacle lens-worn state, the center of a turning movement for turning the test lens being positioned on an optical axis of the light receiving system.

In claim 3 there is described a lens meter including a projection system provided with a projection light source adapted to project a measuring beam onto a lens to be tested, or a test lens, and a light receiving system provided with a light receiving element adapted to receive the measuring beam which has passed through the test lens, optical characteristics of the test lens being determined on the basis of a position in which the light receiving element receives the measuring beam which has passed through the test lens, the lens meter further including a measuring section turning mechanism adapted to turn a measuring section as if the test lens were turned around a center of a turning movement corresponding to that of a turning movement of an eyeball in a spectacle lens-worn state, the said measuring section comprising the projection system and the light receiving system.

In claim 4 there is described a lens meter including a projection system provided with a projection light source adapted to project a measuring beam from a surface side of a lens to be tested, or a test lens, the measuring beam being used to determine optical characteristics of the test lens, and a light receiving system provided with a light receiving element adapted to receive the measuring beam from a back side of the test lens after passage of the beam through the test lens, the optical characteristics of the test lens being determined on the basis of a position in which the light receiving element receives the measuring beam after passage through the test lens, wherein a center of a turning movement corresponding to that of a turning movement of an eyeball is defined by an intersecting point between a light receiving axis orthogonal to a light receiving surface of the light receiving element and the light receiving surface, either the test lens or the light receiving system is constructed so that it can turn around the center of a turning movement, and the projection system is constructed so as to permit a turning movement thereof.

In claim 5 there is described a lens meter in combination with the lens meter of claim 4, wherein the projection system is provided with a collimator lens adapted to project the measuring beam as parallel rays onto the test lens with the projection light source located at an infinitely remote position.

In claim 6 there is described a lens meter in combination with the lens meter of claim 5, wherein when the test lens is a progressive lens and a near-sight portion is to be measured, at least one of the collimator lens and the projection light source is moved in the direction of an optical axis of the projection system for projecting the measuring beam as a divergent beam onto the test lens.

In claim 7 there is described a lens meter in combination with the lens meter of claim 5, wherein when the test lens is a progressive lens and a near-sight portion is to be measured, an auxiliary lens is inserted into the projection system for projecting the measuring beam as a divergent beam onto the test lens.

In claim 8 there is described a lens meter in combination with the lens meter of claim 5, wherein a prism quantity of the test lens is determined on the basis of a turning angle of the projection system.

In claim 9 there is described a lens meter including a projection system provided with a projection light source adapted to project a measuring beam from a surface side of a lens to be tested, or a test lens, the measuring beam being used to determine optical characteristics of the test lens, and a light receiving system provided with a light receiving element adapted to receive the measuring beam from a back side of the test lens after passage of the beam through the test lens, the optical characteristics of the test lens being determined on the basis of a position in which the light receiving element receives the measuring beam after passage through the test lens, wherein a center of a turning movement corresponding to that of a turning movement of an eyeball is defined by an intersecting point between a light receiving axis orthogonal to a light receiving surface of the light receiving element and the said light receiving surface, either the test lens or the light receiving system is constructed so that it can turn around the said center of a turning movement, and the projection system is provided with a prism compensator for obtaining a measuring beam equal to that obtained by turning the projection system about the said center of a turning movement.

In claim 10 there is described a lens meter in combination with the lens meter of claim 9, wherein the projection system is provided with a collimator lens adapted to project the measuring beam as parallel rays onto the test lens with the projection light source located at an infinitely remote position.

In claim 11 there is described a lens meter in combination with the lens meter of claim 10, wherein when the test lens is a progressive lens and a near-sight portion is to be measured, at least one of the collimator lens and the projection light source is moved in the direction of an optical axis of the projection system for projecting the measuring beam onto the test lens with the projection light source located at a finite distance from the test lens.

In claim 12 there is described a lens meter in combination with the lens meter of claim 9, wherein when the test lens is a progressive lens and a near-sight portion is to be measured, an auxiliary lens is inserted into the projection system for projecting the measuring beam as a divergent beam onto the test lens.

In claim 13 there is described a lens meter in combination with the lens meter of claim 9, wherein a prism quantity of the test lens is determined on the basis of a turning angle of the prism compensator.

Opearion

According to claims 1 to 3, optical characteristics which reflect a spectacle lens-worn state to the utmost extent can be obtained by a simple structure.

According to the lens meter described in claim 1 or claim 2, the test lens is turned around a center of a turning movement corresponding to a center of a turning movement, OL, of the eyeball 2 in a spectacle lens 1-worn state, so at the time of measuring the test lens at a peripheral position thereof, the lens receptacle moves relatively away from the back of the lens and therefore the back of the lens is difficult to be flawed in the peripheral measurement of the lens.

According to the lens meter described in claim 3, since the measurement of the test lens at a peripheral position thereof can be done in a fixed state of the test lens, the back of the lens is difficult to be flawed in the peripheral measurement of the lens.

According to the lens meter described in claims 4 to 13, even where the power of the test lens is strong, optical characteristics of the test lens can be measured while minimizing a measurement error at the time of measuring the test lens at a peripheral position thereof.

According to the invention described in claims 6, 7, 11 and 12, at the time of measuring optical characteristics of a near-sight portion which is used for seeing a near place, the measuring beam is directed as a divergent beam to the test lens 14, and the beam used for measuring the near-sight portion of the test lens has an angle close to the angle of beam which is incident on the lens in a lens-worn state, thus making it possible to obtain optical characteristics of the near-sight portion in a more exact manner.

BRIEF DESCRIPTION OF DRAWINGS

FIG. 3 is a diagram showing an example of an optical system used in a conventional lens meter, in which (a) shows a state before setting a test lens to an optical path of the measuring optical system and (b) shows a measured state of optical characteristics of the test lens after setting the test lens to the optical path of the measuring optical system and after moving a measurement target in an optical axis direction;

FIG. 17 is an explanatory diagram which illustrates measuring optical characteristics of the test lens at a peripheral position thereof by turning the test lens around a center of a turning movement instead of turning the light receiving element around the turning center, (a) showing a state in which a projection system has been turned in response to a turning motion of the test lens and (b) showing a state in which the projection system is provided

BEST MODE FOR CARRYING OUT THE INVENTION

[Embodiment 1]

Figure 1:
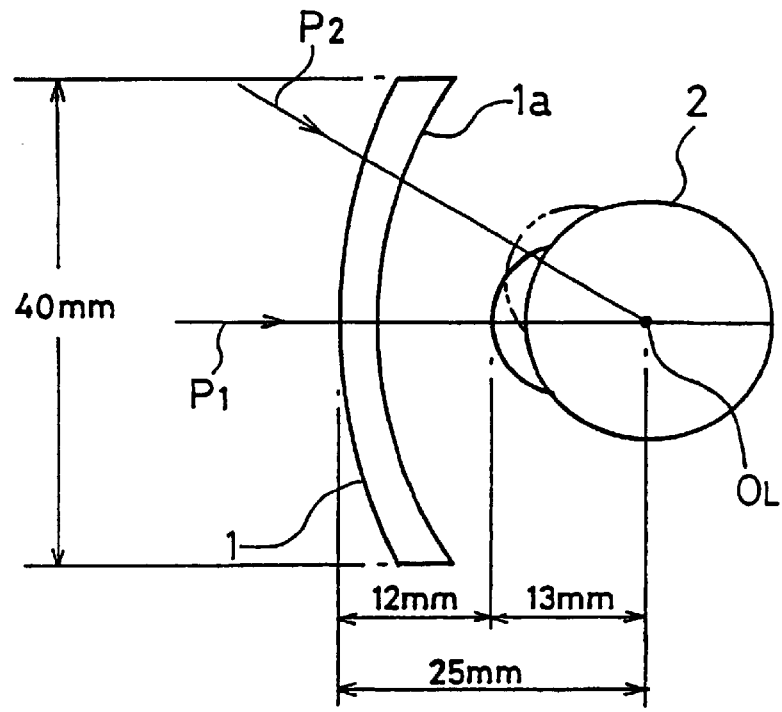
FIG. 1 is a diagram showing a spectacle lens-worn state.
Figure 2:
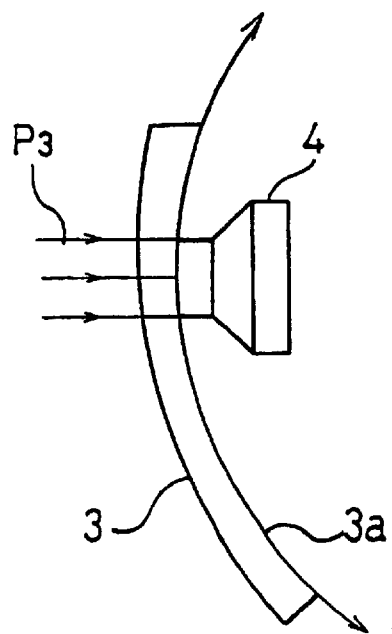
FIG. 2 is an explanatory diagram explaining in what state a test lens is measured using a conventional lens meter.
Figure 4:
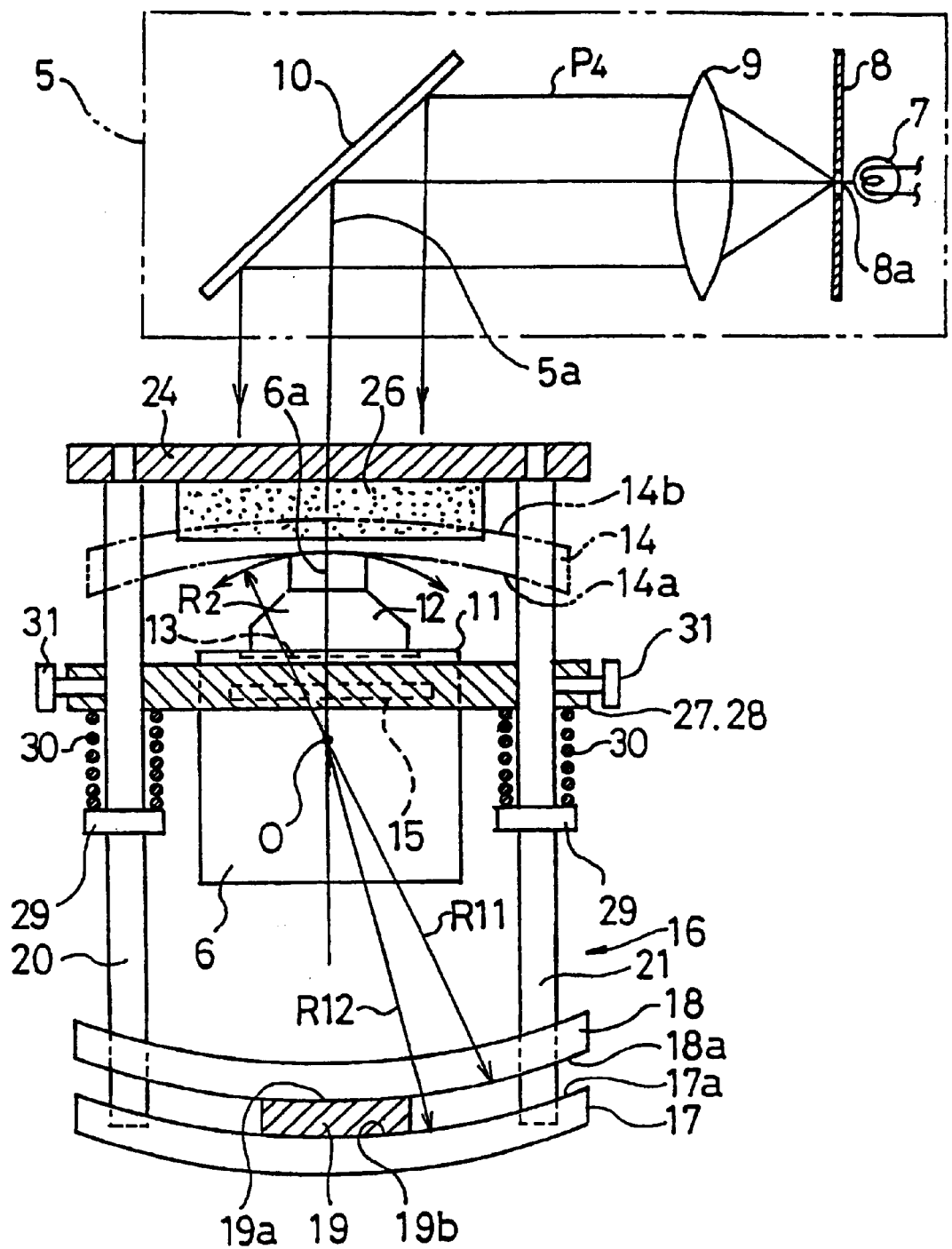
FIG. 4 is a side view of a test lens holding mechanism used in a lens meter according to Embodiment 1 of the present invention.
Figure 18:
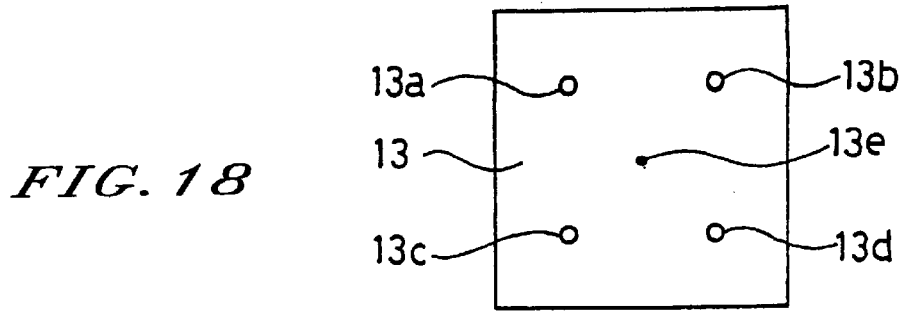
FIG. 18 is a diagram showing an example of a pattern plate according to the present invention.

In FIG. 4, the reference numeral 5 denotes a projection system and numeral 6 denotes a light receiving system, both constituting a measuring section. The projection system 5 is substantially composed of a projection light source 7, a pinhole plate 8, a collimator lens 9, and a reflecting mirror 10. Numeral 5a denotes a measuring optical axis of the projection system 5, numeral 6a denotes an optical axis of the light receiving system 6, and numeral 8a denotes a pinhole. A measuring beam P4 emitted from the projection light source 7 is condensed by the collimator lens 9 and is conducted as parallel rays to the reflecting mirror 10, whereby the beam is reflected and projected toward the light receiving system 6. A lens receiving plate 11 and a lens receptacle 12 are disposed in an optical path between the projection system 5 and the light receiving system 6. Further, a pattern plate 13 is disposed on a lower surface of the lens receiving plate 11. On the pattern plate 13 are formed four such patterns 13a to 13d as shown in FIG. 18. A center 13e surrounded with the patterns 13a to 13d is aligned with a light receiving axis 6a. The projection system 5 projects the measuring beam from a surface side of a test lens 14.

The light receiving system 6 is provided with a CCD 15 as a light receiving element which receives from a back side of the test lens 14 the measuring beam after passage through the test lens. The CCD 15 is connected to a processing circuit (not shown). The processing circuit calculates optical characteristics of the test lens 14 on the basis of a position in which the light receiving element receives the measuring beam which has passed through the test lens 14. When the test lens 14 is not set on the lens receptacle 12, pattern images of the same spacing as that of the patterns 13a to 13d formed on the pattern plate 13 are formed on the CCD 15. When a concave test lens 14 is set on the lens receptacle 12, pattern images of a larger spacing than the spacing of the patterns 13a to 13d formed on the pattern plate 13 are formed on the CCD 15, while when a convex test lens 14 is set on the lens receptacle 12, pattern images of a smaller spacing than the spacing of the patterns 13a to 13d are formed on the CCD 15. On the basis of the spacing of the pattern images formed on the CCD 15 the processing circuit calculates optical characteristic values such as spherical degree of the test lens 14 (see, for example, Japanese Patent Application No. Hei 8-25917).

The test lens 14 is held by a test lens holding mechanism 16 which also serves as a test lens turning mechanism. The test lens holding mechanism 16 is composed of three curved plates 17 to 19 disposed in a sandwich fashion, with the curved plate 19 being sandwiched between the curved plates 17 and 18. The curved plate 19 is fixed to a fixing member (not shown). The curved plates 17 to 19 are each provided with a curved surface which constitutes a part of a spherical surface curved in both X and Y directions.

The curved plates 17 to 19 have a curvature center O common to them. The radius of curvature of a surface 18a of the curved plate 18 and that of a surface 19a of the curved plate 19 are R11, while the radius of curvature of a surface 19b of the curved plate 19 and that of a surface 17a of the curved plate 17 are R12. The curvature center O lies on the light receiving axis 6a of the light receiving system 6.

Figure 5:
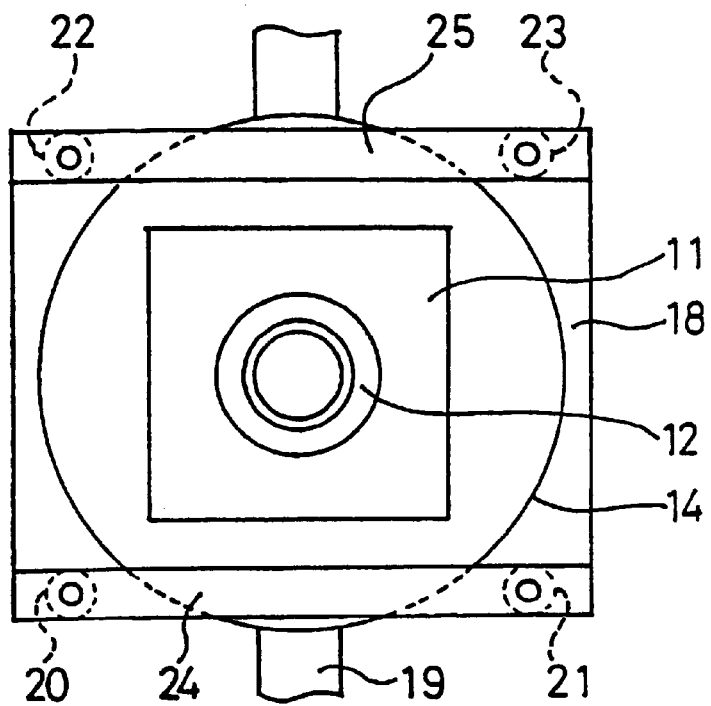
FIG. 5 is a plan view of the test lens holding mechanism.
Figure 6:
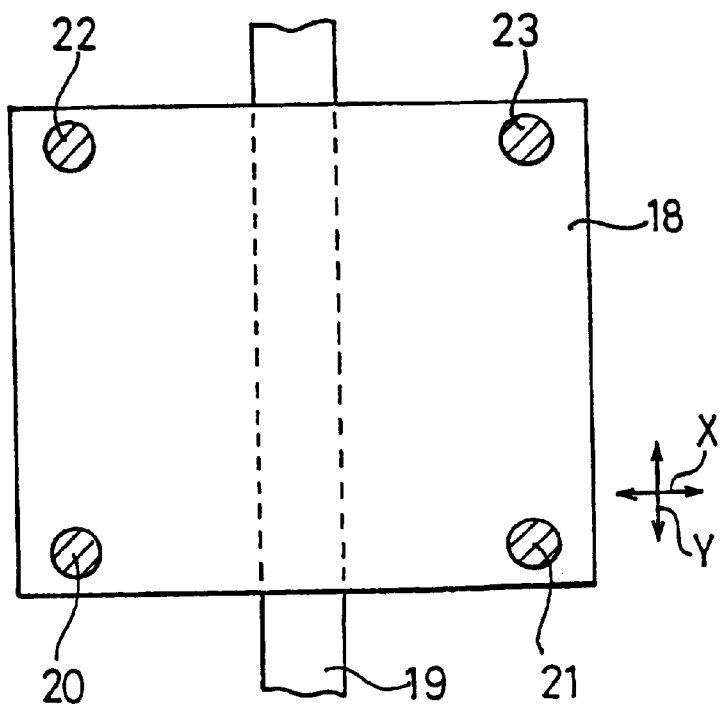
FIG. 6 is a plan view of a curved plate for the test lens shown in FIG. 3.

As shown in FIG. 6, four support rods 20 to 23 are erected and fixed on each of the curved plates 17 and 18. As shown in FIG. 5, connecting plates 24 and 25 are disposed so as to straddle between the tops of the support rods 20 and 21 and between the tops of the support rods 22 and 23, respectively. A sponge member 26 is affixed to the underside of each of the connecting plates 24 and 25.

Movable plates 27 and 28 adapted to come into abutment against a back 14a of the test lens 14 and support the test lens from below are mounted halfway of the support rods 20 to 23. The support rods 20 to 23 are each formed with a flange portion 29 halfway of the associated support rod and below the movable plates 27 and 28. Springs 30 which urge the movable plates 27 and 28 upward are mounted between the flange portions 29 and the movable plates 27, 28. Set-screws 31 are provided at side ends of the movable plates 27 and 28. The movable plates 27 and 28 are fixed to the support rods 20 to 23 by tightening the set-screws 31.

For setting the test lens 14 to the lens holding mechanism 16, first the test lens 14 is put on the lens receptacle 12 so as to be centrally positioned on the lens receptacle and so that the back 14a side of the test lens comes into abutment against the lens receptacle 12. Then, with use of a lens presser member (not shown), the test lens 14 is pressed down from a surface 14b side thereof.

Figure 7:
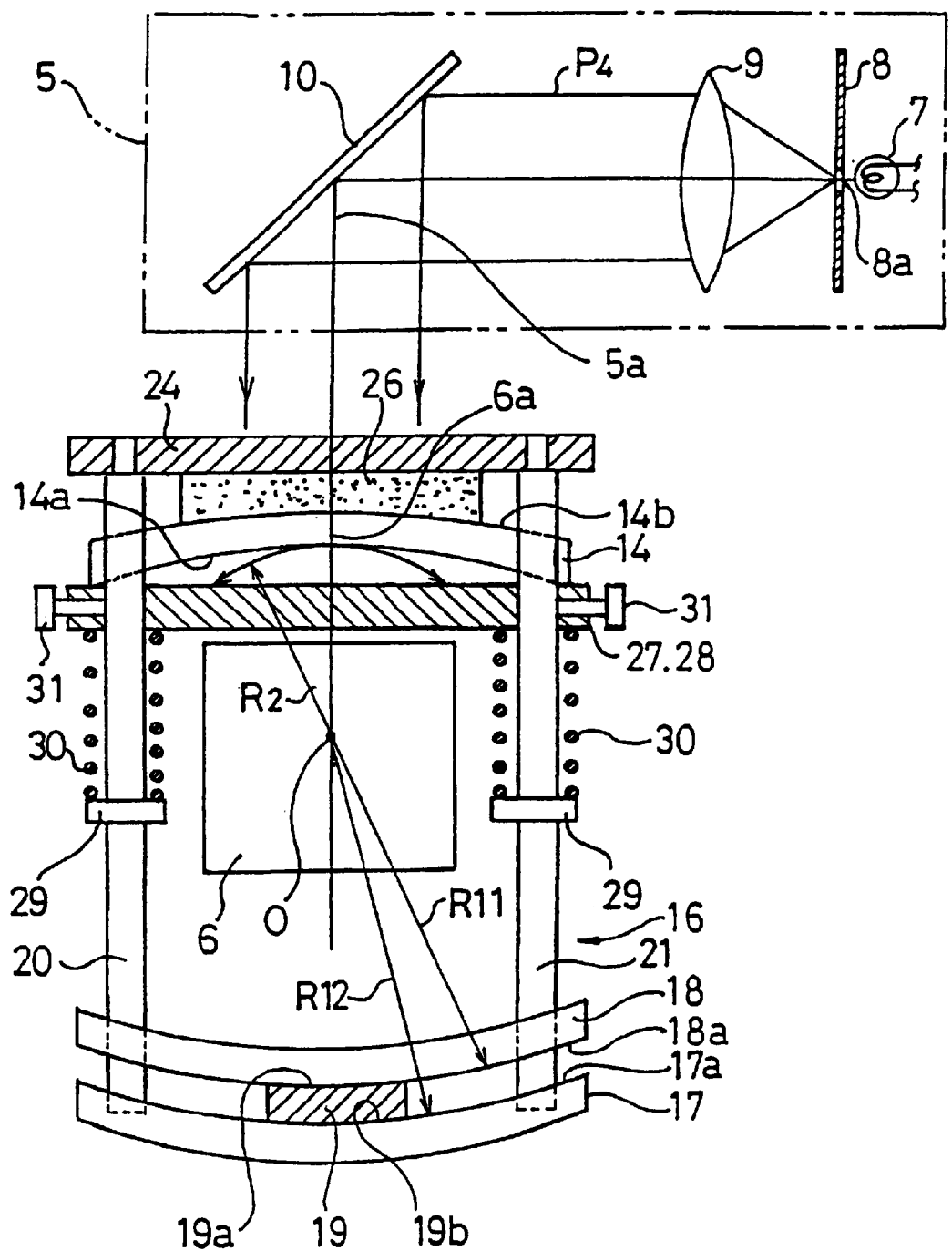
FIG. 7 is a side view of the test lens holding mechanism, showing a state in which the test lens is held in a sandwich fashion between movable plates and a sponge member.

Next, the set-screws 31 are loosened and the movable plates 27 and 28 are raised to hold the test lens 14 between the sponge member 26 and the movable plates 27, 28, as shown in FIG. 7. With the rising motion of the movable plates 27 and 28, the sponge member 26 is compressed. The movable plates 27 and 28 assume appropriate positions automatically under the action of the springs 30. It goes without saying that the biasing force of the springs 30 is weaker than the pressing force of the lens presser member and stronger than the urging force of the sponge member 26. With the test lens 14 sandwiched between the movable plates 27, 28 and the sponge member 26, the movable plates 27 and 28 are fixed to the support rods 20 to 23 with the set-screws 31.

Then, the lens presser member is released and the lens receptacle 12 is retracted away from the test lens 14. If the movable plates 27 and 28 are not fixed with the set-screws 31 and if the lens presser member and the lens receptacle 12 are removed, the movable plates 27 and 28 will rise under the rising force of the springs 30, with the result that the distance from the curvature center O corresponding to the turning center OL of the eyeball in a worn state of the spectacle lens 1 to the back 14a of the test lens 14 changes. However, since the movable plates 27 and 28 are fixed to the support rods 20 to 23 with the set-screws 31, the distance from the curvature center O to the back 14a of the test lens 14 is kept constant.

In measuring the test lens 14 at a peripheral position thereof and when the test lens 14 thus held is turned in the arrow X direction, the test lens holding mechanism 16 is turned in the X direction around the curvature center O, while when the test lens 14 is turned in the arrow Y direction, the test lens holding mechanism 16 is turned in the Y direction around the curvature center O, whereby the test lens 14 can be turned around the turning center corresponding to the turning center OL of the eyeball 2 in a spectacle lens-worn state. Although the distance R2 from the curvature center O to the back 14a of the test lens 14 is 25 mm in this embodiment, it may be set at 27 mm.

In this embodiment, since the lens receptacle 12 is retracted from the test lens 14 at the time of turning the test lens 14 around the curvature center O, the test lens can be turned in the measurement without flawing the back 14a thereof.

Figure 8:
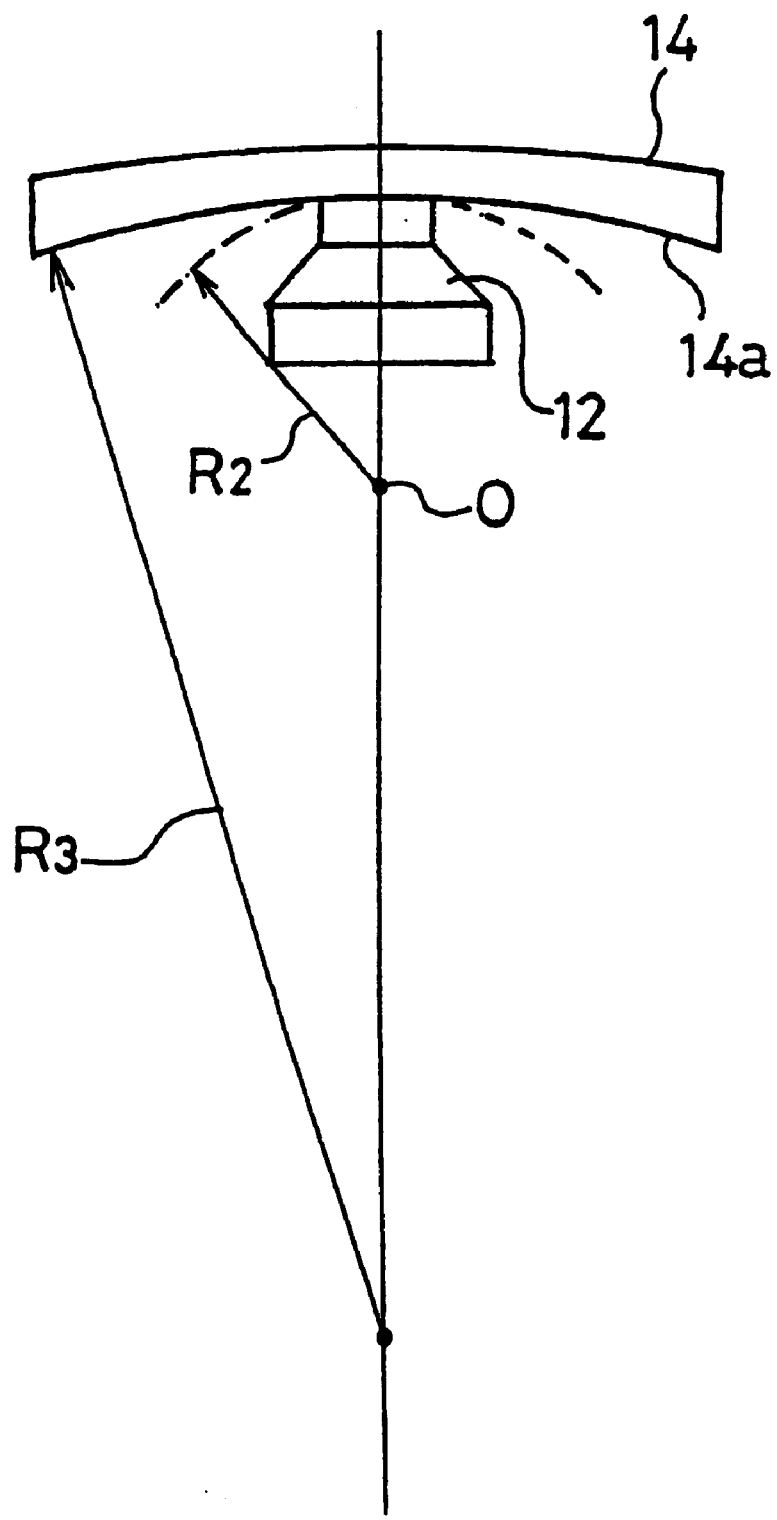
FIG. 8 is an explanatory diagram showing a relation between a center of a turning movement of the test lens and the radius of curvature of a back of the lens.

Even with the lens receptacle 12 left mounted on the lens receiving plate 11, the measurement can be made by turning the test lens 14. Even in this case, since the distance R2 from the curvature center O to the back 14a of the test lens 14 is smaller in comparison with the radius of curvature R3 of the lens back 14a, the lens receptacle 12 moves relatively away from the lens back 14a, as shown in FIG. 8, and thus the back 14a is difficult to be flawed at the time of measuring a peripheral position of the test lens 14.

[Modification 1]

Figure 9:
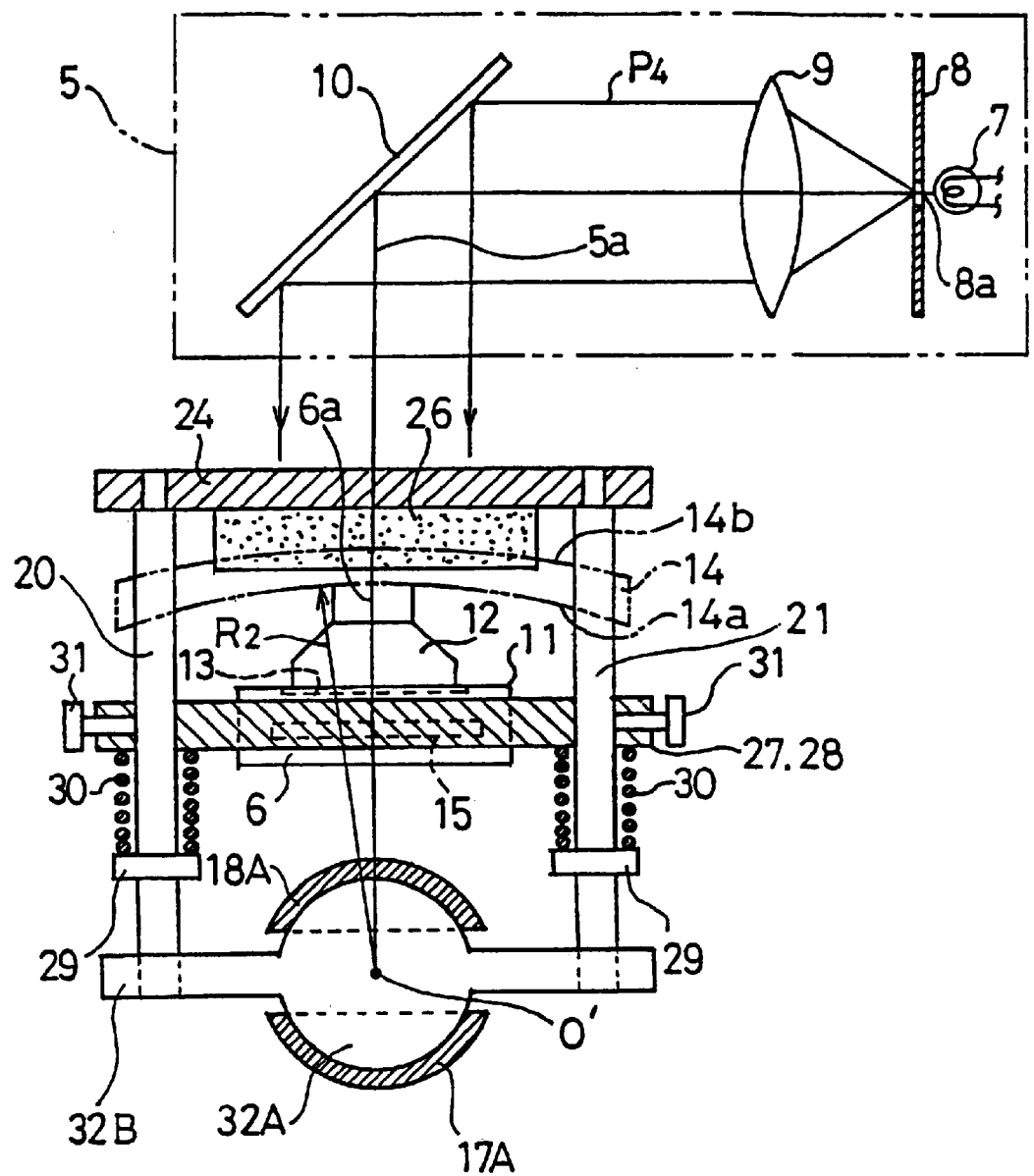
FIG. 9 is an explanatory diagram of a lens meter according to Modification 1 in the present invention.

FIG. 9 shows a lens meter according to Modification 1 in the present invention. In this lens meter, a ball 32A is supported by curved fixing plates 17A and 18A of a shape conforming to part of a spherical surface to constitute a universal joint, a support plate 32B is attached to the ball 32A, and lower end portions of the support rods 20 to 23 are fixed to the support plate 32B. The ball 35 is turned with respect to the curved fixing plates 17A and 18A, thereby causing the test lens 14 to turn around a center O' of the ball 32A. The distance R2 from the center O' to the back 14a of the test lens 14 is set at a distance, say, 25 mm corresponding to the distance from the turning center of the eyeball to the back 1a of the spectacle lens 1 in a worn state of the lens.

[Modification 2]

Figure 10:
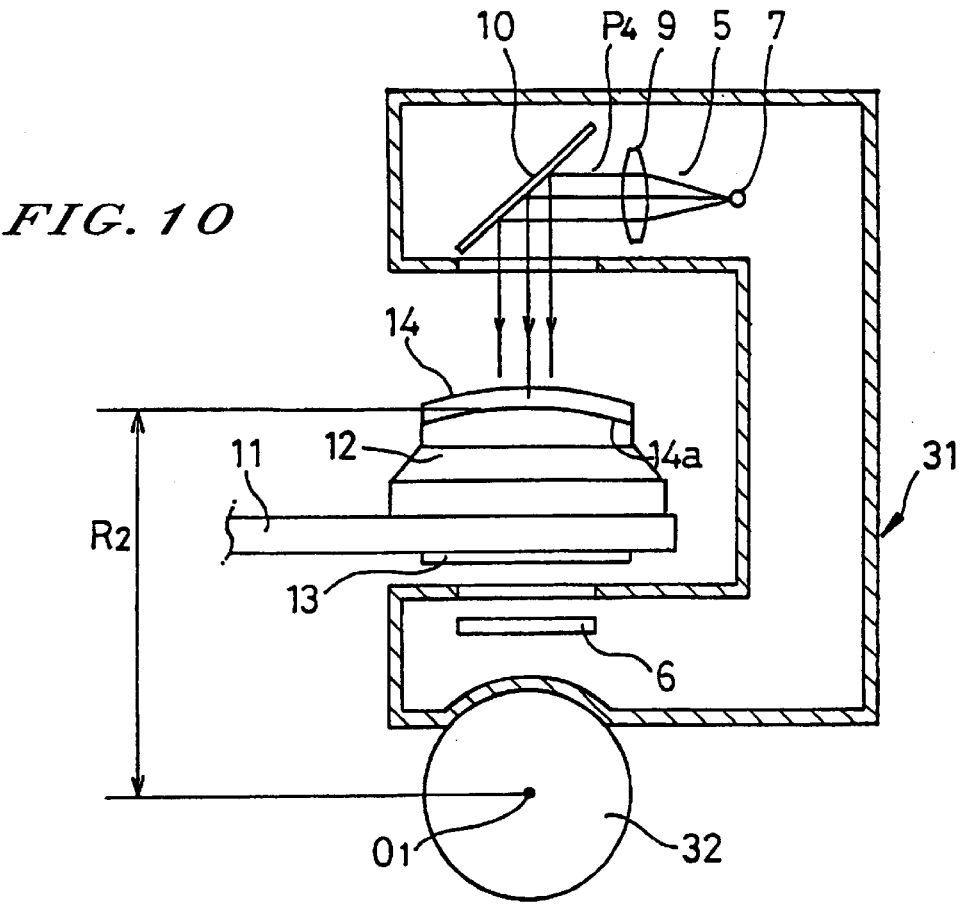
FIG. 10 is an explanatory diagram of a lens meter according to Modification 2 in the present invention.

FIG. 10 shows a lens meter according to Modification 2 in the present invention. In this lens meter, a lens receptacle 12 is fixed onto a lens plate 11, a test lens 14 is put on the lens receptacle 12, a ball 32 serving as a measuring section turning mechanism is mounted on the underside of a measuring section 31 which comprises a projection system 5 and a light receiving system 6, and the measuring section 31 is turned around a curvature center O1 of the ball 32. The distance R2 from the curvature center O1 to a back 14a of the test lens 14 is set at a distance, say, 25 mm corresponding to the distance from the turning center of the eyeball to the back 1a of the spectacle lens 1 in a worn state.

According to this construction, the measuring section 31 consisting of the projection system 5 and the light receiving system 6 can be turned as if the test lens 14 were turned around a turning center corresponding to the turning center OL of the eyeball 2 in a worn state of the spectacle lens 1.

[Modification 3]

Figure 11:
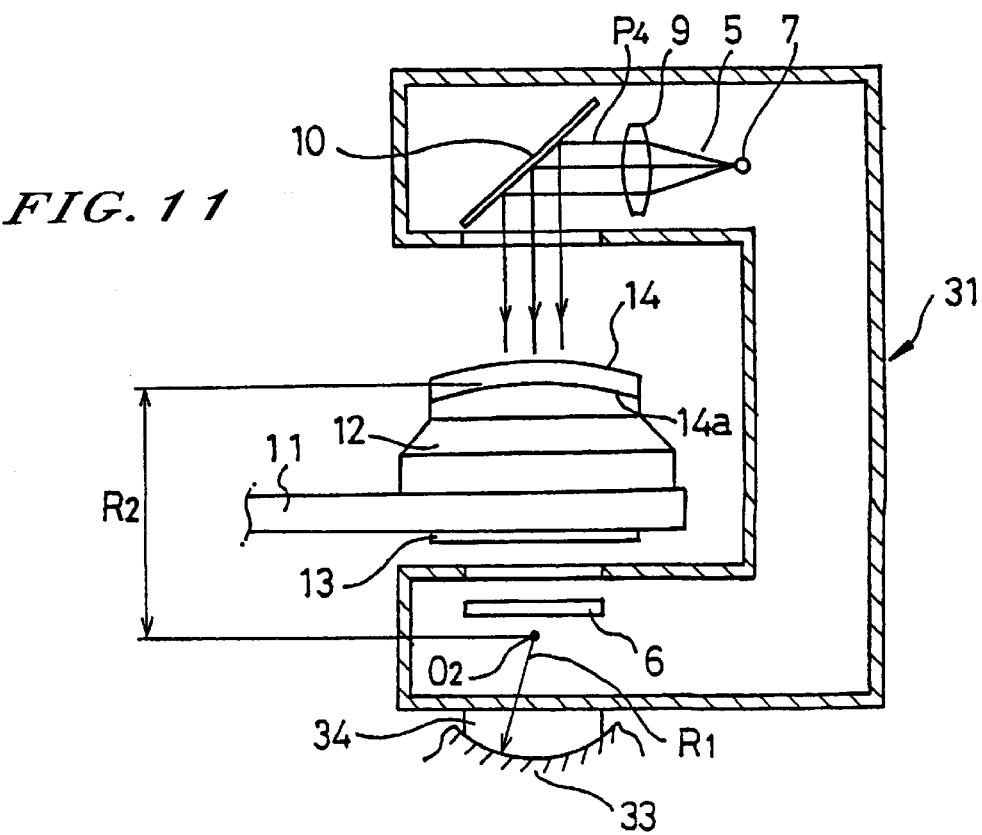
FIG. 11 is an explanatory diagram of a lens meter according to Modification 3 in the present invention.

FIG. 11 shows a lens meter according to Modification 3 in the present invention. In this lens meter, the lens receptacle 12 is fixed onto the lens plate 11, the test lens 14 is put on the lens receptacle 12, a spherically curved concave portion 33 and a spherically curved convex portion 34, both constituting a measuring section turning mechanism, are provided on the underside of the measuring section 31 consisting of the projection system 5 and the light receiving section 6, and the measuring section is turned around a curvature center O2 of the spherically curved concave portion 33. The distance R2 from the curvature center O2 of the spherically curved concave portion 33 to the back 14a of the test lens 14 is set at a distance corresponding to the distance from the turning center OL of the eyeball 2 to the back 1a of the spectacle lens 1 in a worn state as in Modification 1. The reference numeral R2 denotes the radius of curvature of the spherically curved concave portion 33.

According to the above Modifications 2 and 3, since the measurement at a peripheral position of the test lens 14 can be done with the test lens 14 left fixed to the lens receptacle 12, there accrues an advantage that the back 14a of the test lens is difficult to be flawed in the said measurement in comparison with the embodiment of the invention wherein the test lens 14 is turned in the measurement of a peripheral position thereof.

[Embodiment 2]

In the previous Embodiment 1 of the invention, a measuring beam is projected from the surface side of the test lens 14. According to the optical construction of Embodiment 1, if the power of the test lens 14 is too strong and if the angle between the central optical axis of the test lens 14 and the optical axis of the projection system (or the optical axis of the light receiving system) is relatively large, the measuring beam after passage through the test lens 14 will not pass through the turning center of the eyeball, resulting in a larger measurement error in optical characteristic values of the test lens.

Figure 12:
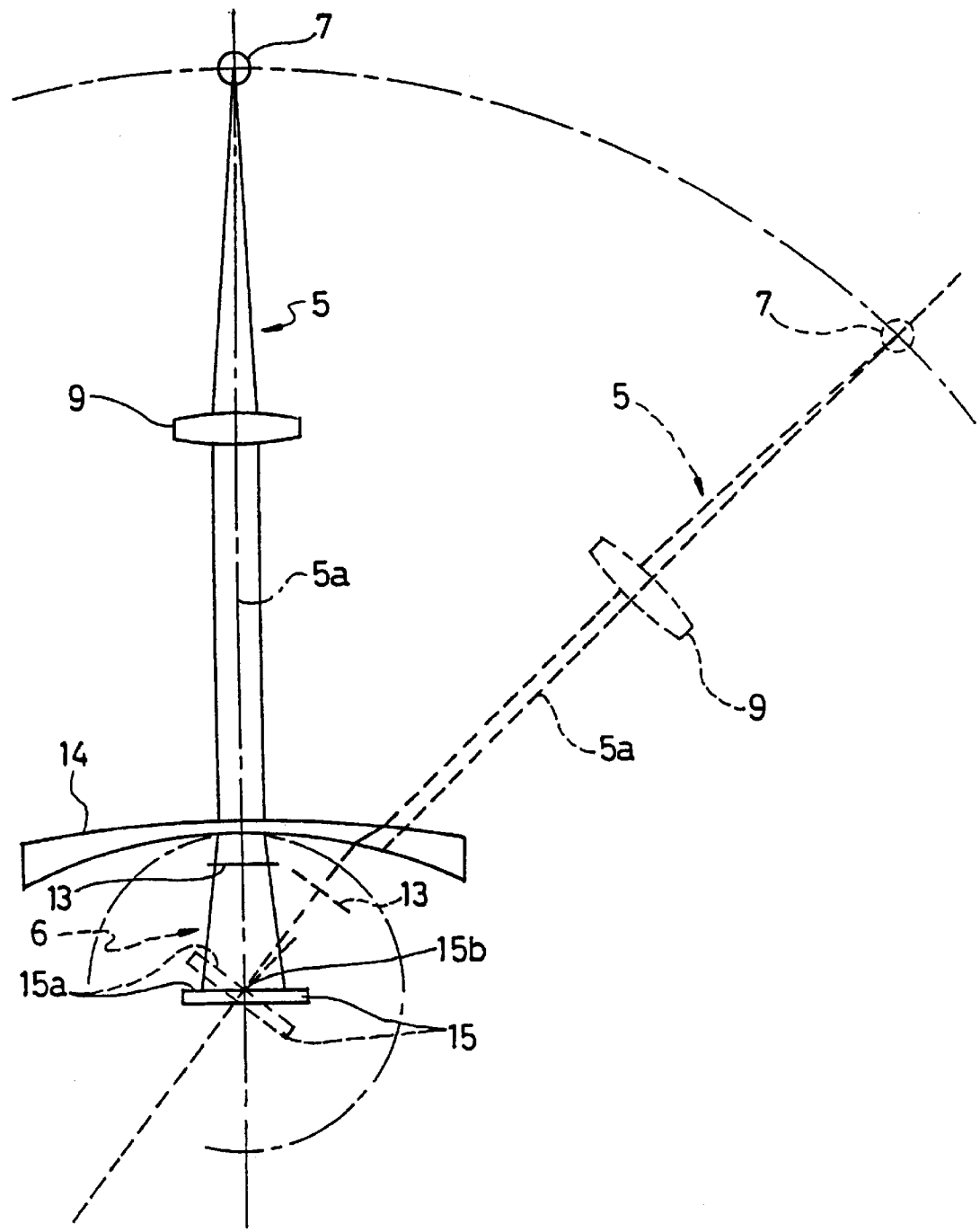
FIG. 12 is a schematic diagram showing an optical system used in a lens meter according to Embodiment 2 of the present invention.

In view of this point, according to the construction of Embodiment 2, as shown in FIG. 12, a center of a turning movement, or a turning center, corresponding to the turning center OL of the eyeball is positioned at an intersecting point 15b of a light receiving axis 6a orthogonal to a light receiving surface 15a of a CCD 15 which serves as a light receiving element and the light receiving surface 15a, and either a test lens 14 or a light receiving system 6, as well as a projection system 5, are made capable of turning around the turning center. As in the previous Embodiment 1, the projection system 5 is integrally provided with a projection light source 7 for the projection of a measuring beam and a collimator lens 9 which projects the measuring beam as parallel rays onto the test lens 14 while allowing the projection light source 7 to assumed an infinitely remote position. The light receiving system 6 is integrally provided with a pattern plate 13 and the light receiving element.

In FIG. 12, not only the light receiving system 6 but also the projection system 5 is turned around the intersecting point 15b which is the turning center. This turned state is indicated by broken lines in the same figure.

Figure 13:
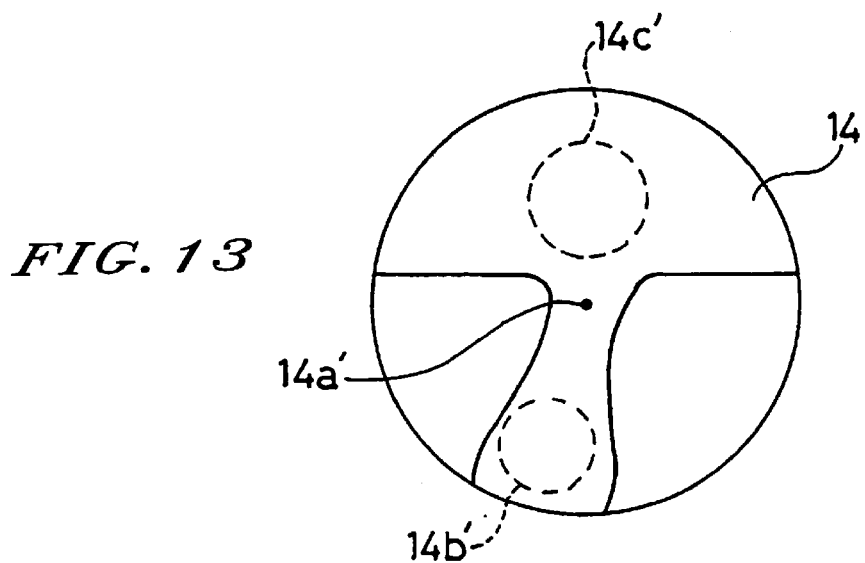
FIG. 13 is a plan view showing schematically a progressive lens as a test lens; with a prism compensator for obtaining a measuring beam equal to the measuring beam obtained by turning the projection system around the turning center.

In this Embodiment 2, the test lens 14 is assumed to be a progressive lens shown in FIG. 13, and measurement is to be made for a near-sight portion 14b' which is present about 20 mm below a center 14a ' of the test lens 14. A description will be given below of this measurement with reference to FIGS. 14 and 15.

Figure 14:
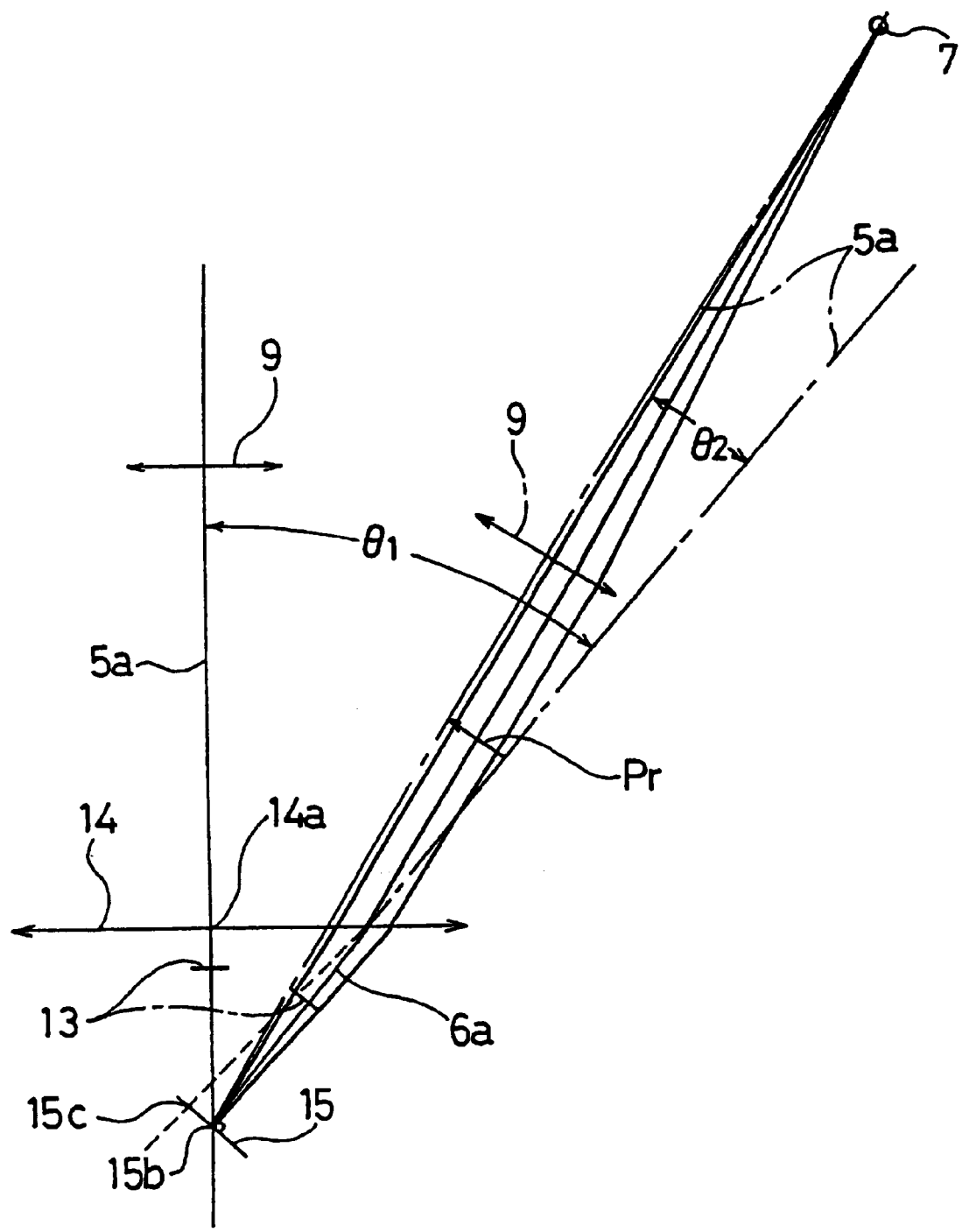
FIG. 14 is a schematic diagram explaining in what procedure optical characteristics of a near-sight portion of the progressive lens are measured using the optical system shown in FIG. 12 and showing in what state a measuring beam which has passed through the test lens is incident on a CCD.

First, as shown in FIG. 14, both projection system 5 and light receiving system 6 are turned by an angle θ1 of 40° around the turning center. As a result, an optical axis 5a of the projection system 5 is refracted with a refractive force of the test lens 14 and an intersecting point 15c of the light receiving surface 15a and the optical axis 5a is displaced from the intersecting point 15b. Consequently, as shown in FIG. 15(a), a center 13e' surrounded with pattern images 13a' to 13d' formed on the light receiving surface 15a is displaced from the intersecting point 15b.

Figures 15A, 15B:
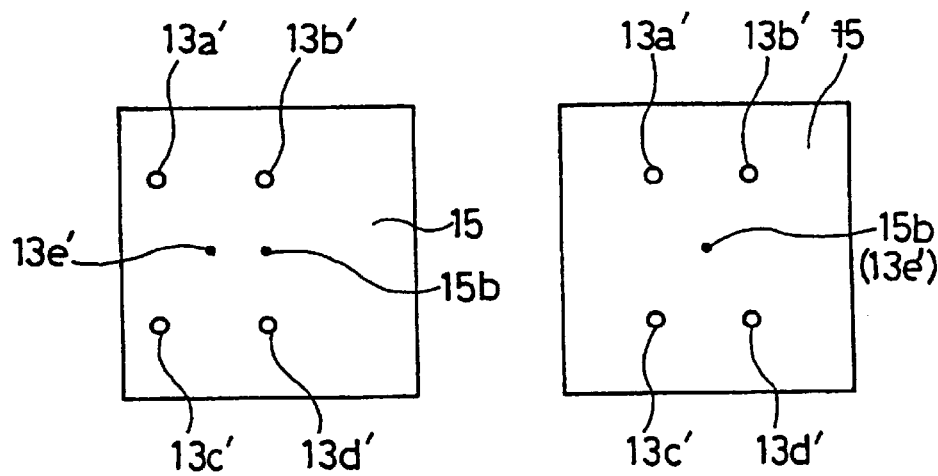
FIG. 15 is an explanatory diagram showing an example of a pattern image formed on a light receiving surface of the CCD, in which (a) shows a deviated state of the center of the pattern image from a light receiving axis of the light receiving element and (b) shows a coincident state of the pattern image center with the light receiving axis of the light receiving element.

A processing circuit calculates an amount of displacement between the center 13e' and the intersecting point 15c and causes the projection system 5 to turn automatically in the opposite direction around the turning center by an angle of θ2 so that the center 13e' of the pattern images 13a' to 13d' becomes coincident with the intersecting point 15b as shown in FIG. 15(b). In this state, spherical degree S, cylindrical degree C, and axial angle A are determined in accordance with the known calculation procedure. Further, prism quantity Pr is determined on the basis of the angle θ2.

Although the projection system 5 is thus turned in the opposite direction automatically, there may be adopted a construction wherein the projection system 5 is turned so as to let the center 13e' become coincident with the intersecting point 15e with use of a joy stick (not shown) while seeing pattern images displayed on the screen.

By so doing, even in the case where the power of the test lens 14 is strong and the turning angle is large, it is possible to measure optical characteristics of the test lens 14 while minimizing the measurement error.

Figure 16:
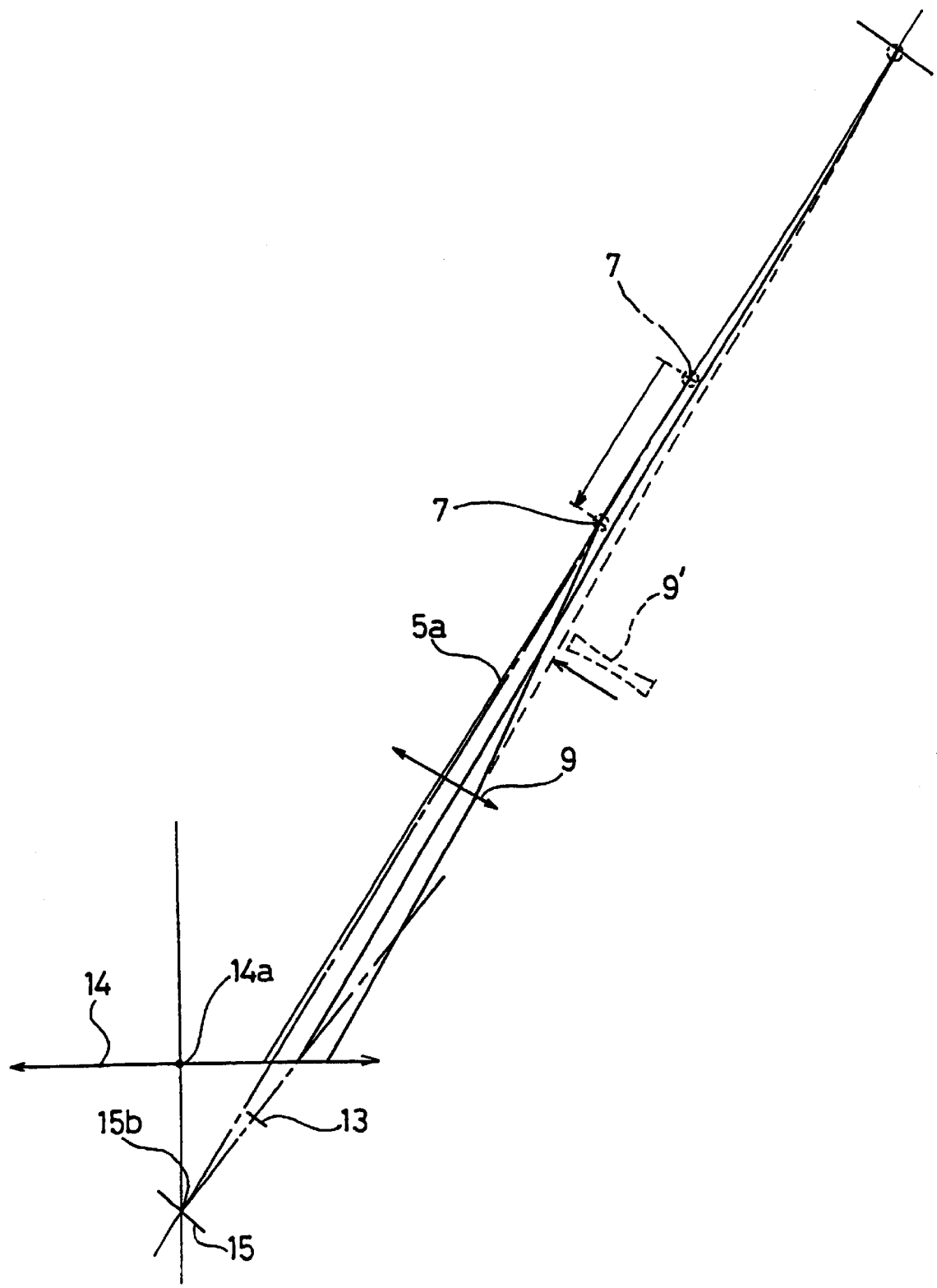
FIG. 16 is a schematic diagram showing a projected state of a divergent beam on the test lens by moving a projection light source shown in FIG. 16 along a measuring optical axis.

Since the near-sight portion is used for seeing a near place, if optical characteristics of the near-sight portion are to be measured, it is recommended to adopt a construction wherein, as shown in FIG. 16, the projection light source 7 is moved along the optical axis 5a and the measuring beam is made incident as a divergent beam on the test lens 14. This construction permits measurement of the near-sight portion in a more accurate manner. Instead of moving the projection light source 7 along the optical axis 5a, the collimator lens 9 may be moved along the optical axis 5a, or an auxiliary lens 9' indicated with a broken line may be inserted into the optical path of the projection system 5.

FIG. 17 is a schematic diagram of an optical system used measuring optical characteristics of the test lens 14 by turning the test lens instead of turning the light receiving element. In the event of off-center of pattern images 13a' to 13d' with a turning movement of the test lens 14, the projection system 5 may be turned automatically as in FIG. 17(a), or a prism compensator 35 may be provided in the projection system 5 and turned automatically to obtain a measuring beam equal to that obtained by turning the projection system around the turning center. Further, the prism quantity Pr may be determined on the basis of a turning angle of the prism compensator 35.

[Embodiment 3]

Figure 19:
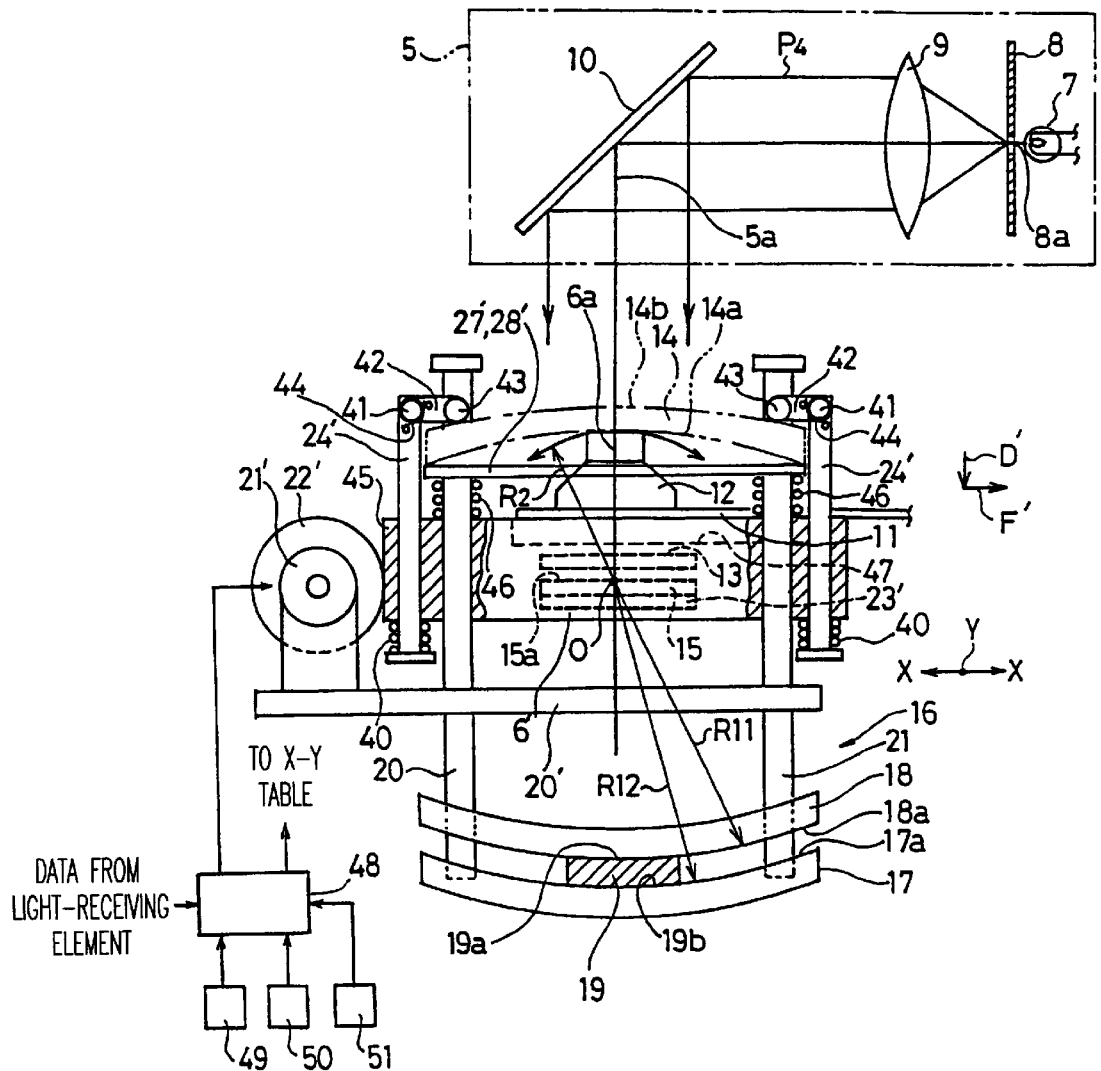
FIG. 19 is an explanatory diagram of Embodiment 3 of the present invention.

FIG. 19 shows a construction wherein the test lens 14 and a light receiving unit 6' are turned around the turning center O. The light receiving unit 6' is supported vertically movably by support rods 20 to 23. A mounting plate 20' is fixed to the support rods 20 to 23, a drive motor 21' is fixed to the mounting plate 20', and a pinion 22' is mounted on an output shaft of the drive motor 21'.

The light receiving unit 6' is provided with an XY table 23', a light receiving element 15, and a pattern plate 13. The pattern plate 13 is fixed to the light receiving unit 6' and the light receiving element 15 is relatively movable in X-Y directions with respect to the pattern plate 13 by means of the XY table.

The light receiving unit 6' is further provided with presser rods 24', which are urged downward by means of springs 40. On top of each presser rod 24' is provided a presser arm 42 so that it can turn about an axis 41. A rubber presser roller 43 is provided at an end of the presser arm 42.

The presser arm 42 is urged by means of a torsion coil spring 44 in a direction in which the rubber presser roller 43 comes into abutment against a surface 14b side of the test lens 14.

A rack 45 is disposed sideways of the light receiving unit 6' and is in mesh with the pinion 22'. Movable plates 27' and 28' are disposed above the light receiving unit 6' and are urged upward by means of springs 46.

A recess 47 is formed above the light receiving unit 6', and both lens receiving plate 11 and lens receptacle 12 are retractable toward the recess 47. More particularly, with a retracting means (not shown), the lens receiving plate 11 and the lens receptacle 12 move down in the direction of arrow D' toward the recess 47 and are then retracted in the direction of arrow F' from the turning mechanism.

The drive motor 21' is controlled by a processing control circuit 48. The XY table 23' and the retracting means (not shown) are also controlled by the processing control circuit 48. The processing circuit 48 has a CL mode for measuring optical characteristics of an optical center of the test lens 14 put on the lens receptacle 12 and also has a turning mode for measuring the peripheral portion of the test lens 14 with the lens receptacle 12 retracted. The measuring mode becomes CL mode upon pushing a CL mode button 49 and the turning mode upon pushing a turning mode button 50.

The light receiving unit 6' controls the drive motor 21' so that the light receiving surface 15a of the light receiving element 15 is positioned on the turning center O. In this state, the test lens 14 is put on the lens receptacle 14, the presser rods 24' are pulled out, and the test lens is pressed down from above by the presser arms 42. The upward urging force of the springs 46 is set larger than the downward urging force of the presser arms 42, and the downward urging force of the springs 40 is set larger than the upward urging force of the springs 46. When the presser arms 42 have pressed down the test lens 14, their turning motion in the opposite direction is inhibited by locking pawls (not shown), whereby the distance from a back 14a of the test lens 14 to the turning center O is defined. In the CL mode, upon pushing a measurement start button 51, an optical center of the test lens 14 is measured with the test lens put on the lens receptacle 12.

Where the test lens 14 is a progressive lens, a change is made to the turning mode by pushing the turning mode button 50. Upon subsequent depression of the measurement start button 51, the lens receiving plate 11 moves down in the direction of arrow D' and then moves in the arrow F' direction, whereby the lens receptacle 12 is retracted from the turning mechanism.

Then, the test lens 14 and the light receiving unit 6' are turned around the turning center O.

Such pattern images 13a' to 13d' as shown in FIG. 15(a) are formed on the light receiving surface 15a of the light receiving element 15 and a central position 13e' of the pattern images 13a' to 13d' is displaced from an intersecting point 15b.

The processing control circuit 48 controls the XY table 23 so that the central position 13e' of the pattern images 13a' to 13d' coincides with the intersecting point 15b, as shown in FIG. 15(b).

Figure 20:
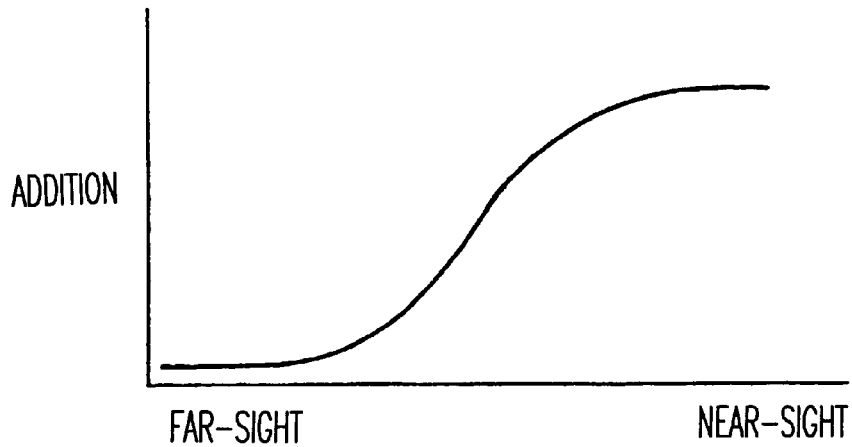
FIG. 20 is a diagram showing an example of displaying additions of a progressive lens.

In the case of a progressive lens, optical characteristics of a far-sight portion 14c' are measured and stored in the processing control circuit 48. With a turning motion of the turning mechanism, optical characteristics are measured continuously toward a nearsight portion 14b' shown in FIG. 13 and are stored. The processing control circuit 48 calculates additions shown in FIG. 20 and causes it to be displayed on a monitor (not shown).

Figure 21:
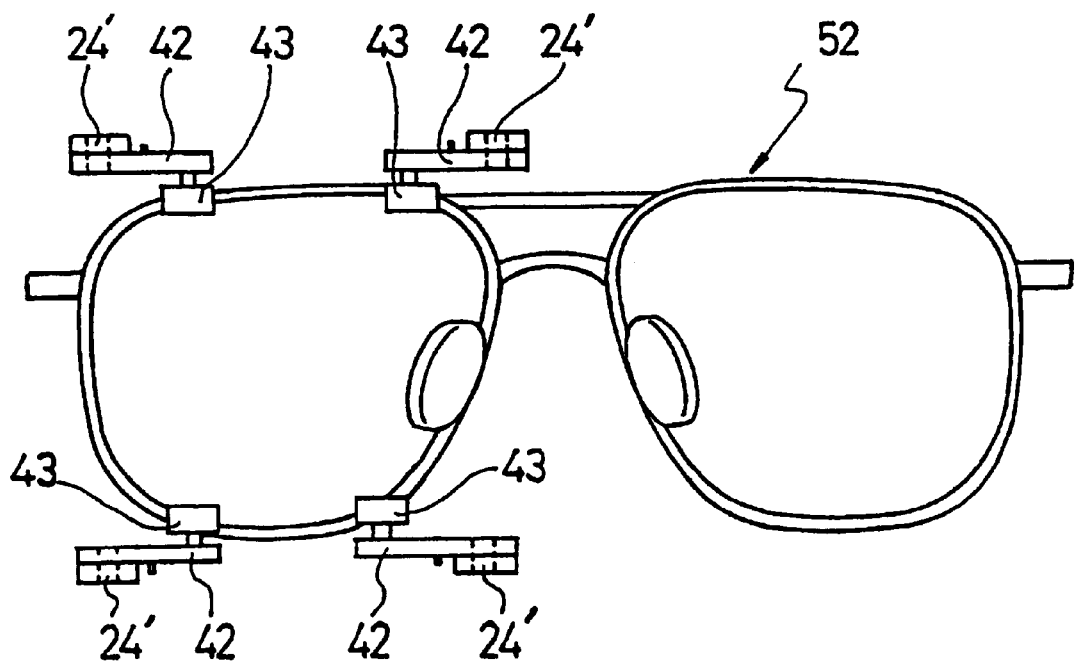
FIG. 21 is a diagram showing an example of measuring a framed spectacle lens.

Although in this Embodiment 3 a raw lens is used as the test lens 14, such a spectacle-framed lens 52 after machining as shown in FIG. 21 may be set for measurement. In this case, as a mechanism for setting and holding the spectacle-framed lens 52 there may be used a holding mechanism which is used in a known frame leader.

Although in this Embodiment the lens receptacle 12 is retracted by a retracting means, if the lens receptacle 12 is formed of a transparent material, it is not necessary to retract the lens receptacle 12 and in this case it is possible to omit the turning mechanism.

[Modification]

Figure 22:
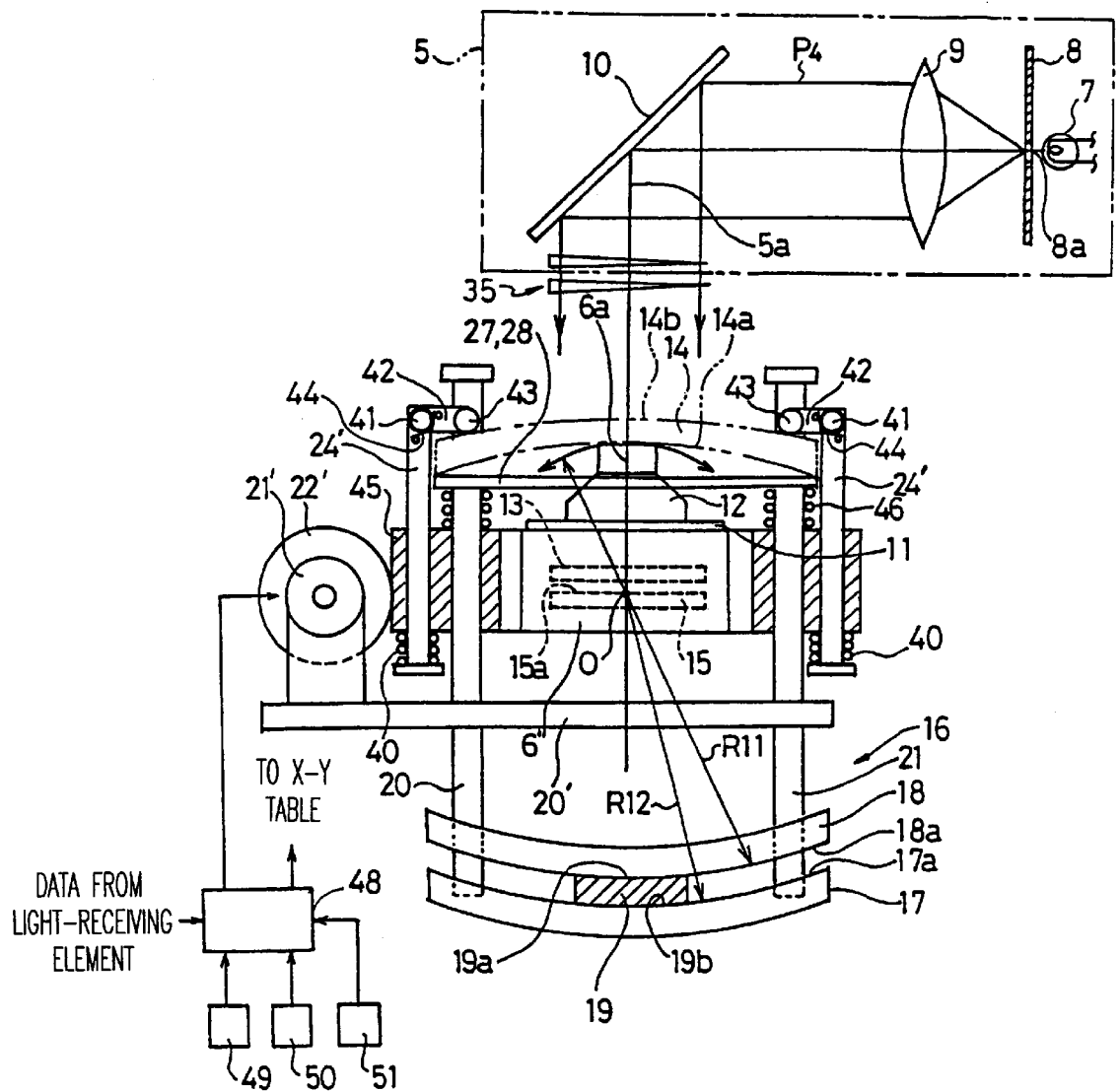
FIG. 22 is a diagram showing a modification of Embodiment 3.

Although according to the construction of Embodiment 3 described above both test lens 14 and light receiving unit 6' are turned around the turning center O, there may be adopted such a construction as shown in FIG. 22 wherein the light receiving system 6' is fixed and only the test lens 14 is turned, and a prism compensator 35 is disposed in the optical path of the projection system 5. In this case, when the measuring mode is the CL mode, the prism compensator 35 is retracted from the optical path of the projection system 5 automatically, while in the turning mode, the prism compensator 35 is inserted into the optical path of the projection system 5 automatically.

Other constructional points are almost the same as in the above Embodiment 3 and therefore detailed explanations thereof will be omitted.

No limitation is made to the turning mechanism referred to in the above Embodiment 3 insofar as the distance from the back 14a of the test lens 14 to the turning center O can be determined with a high accuracy.

Industrial Applicability

According to the lens meter described in claims 1 to 3, optical characteristics which reflect a spectacle lens-worn state to the utmost extent can be obtained by a simple structure.

According to the construction of the lens meter described in claim 1 or claim 2, the test lens is turned around a center of a turning movement corresponding to a turning movement center OL of the eyeball 2 in a worn state of the spectacle lens 1, so in measuring a peripheral position of the test lens the lens receptacle moves in a direction relatively away from the back of the lens and therefore the back of the lens is difficult to be flawed.

According to the lens meter described in claim 3, the back of the lens is difficult to be flawed in measuring a peripheral position of the test lens because the same measurement is made in a fixed state of the test lens.

According to the lens meter described in claims 4 to 13, even with a strong power of the test lens, optical characteristics can be determined while minimizing the measurement error at the time of measuring a peripheral position of the test lens.

According to the invention described in claims 6, 7, 11 and 12, in the case of measuring optical characteristics of a near-sight portion which is used for seeing a near place, a measuring beam is directed as a divergent beam to the test lens 14, the divergent beam being incident at an angle close to that of light rays incident on the lens in a worn state, and therefore optical characteristics of the near-sight portion can be obtained in a more accurate manner.

What is claimed is:

1. A lens meter including:
   a projection system provided with a projection light source adapted to project a measuring beam onto a lens to be tested, or a test lens, and a light receiving system provided with a light receiving element adapted to receive the measuring beam which has passed through said test lens, optical characteristics of the test lens being determined on the basis of a position in which said light receiving element receives the measuring beam which has passed through the test lens,
   the lens meter further including a test lens turning mechanism adapted to turn said test lens around a center of a turning movement corresponding to that of a turning movement of an eyeball in a spectacle lens-worn state.

2. A lens meter including a projection system provided with a projection light source adapted to project a measuring beam onto a lens to be tested, or a test lens, and a light receiving system provided with a light receiving element adapted to receive the measuring beam which has passed through said test lens, optical characteristics of the test lens being determined on the basis of a position in which said light receiving element receives the measuring beam which has passed through the test lens, the lens meter further including a test lens holding mechanism adapted to hold said test lens and turn the test lens around a center of a turning movement corresponding to that of a turning movement of an eyeball in a spectacle lens-worn state, said center of a turning movement for turning the test lens being positioned on an optical axis of said light receiving system.

3. A lens meter including:

a projection system provided with a projection light source adapted to project a measuring beam onto a lens to be tested, or a test lens, and a light receiving system provided with a light receiving element adapted to receive the measuring beam which has passed through said test lens, optical characteristics of the test lens being determined on the basis of a position in which said light receiving element receives the measuring beam which has passed through the test lens, the lens meter further including a measuring section turning mechanism adapted to turn a measuring section as if said test lens were turned around a center of a turning movement corresponding to that of a turning movement of an eyeball in a spectacle lens-worn state, said measuring section comprising said projection system and said light receiving system.

4. A lens meter including:

a projection system provided with a projection light source adapted to project a measuring beam from a surface side of a lens to be tested, or a test lens, said measuring beam being used to determine optical characteristics of said test lens; and a light receiving system provided with a light receiving element adapted to receive the measuring beam from a back side of said test lens after passage of the beam through the test lens, the optical characteristics of the test lens being determined on the basis of a position in which said light receiving element receives the measuring beam after passage through the test lens, wherein a center of a turning movement corresponding to that of a turning movement of an eyeball is defined by an intersecting point between a light receiving axis orthogonal to a light receiving surface of the light receiving element and said light receiving surface, either said test lens or said light receiving system is constructed so that it can turn around said center of a turning movement, and said projection system is constructed so as to permit a turning movement thereof.

5. A lens meter according to claim 4, wherein said projection system is provided with a collimator lens adapted to project said measuring beam as parallel rays onto said test lens with said projection light source located at an infinitely remote position.

6. A lens meter according to claim 5, wherein when said test lens is a progressive lens and a near-sight portion is to be measured, at least one of said collimator lens and said projection light source is moved in the direction of an optical axis of said projection system for projecting said measuring beam as a divergent beam onto the test lens.

7. A lens meter according to claim 5, wherein when said test lens is a progressive lens and a near-sight portion is to be measured, an auxiliary lens is inserted into said projection system for projecting said measuring beam as a divergent beam onto the test lens.

8. A lens meter according to claim 5, wherein a prism quantity of said test lens is determined on the basis of a turning angle of said projection system.

9. A lens meter including:

a projection system provided with a projection light source adapted to project a measuring beam from a surface side of a lens to be tested, or a test lens, said measuring beam being used to determine optical characteristics of said test lens;

and a light receiving system provided with a light receiving element adapted to receive said measuring beam from a back side of said test lens after passage of the measuring beam through the test lens, the optical characteristics of the test lens being determined on the basis of a position in which said light receiving element receives the measuring beam after passage through the test lens, wherein a center of a turning movement corresponding to that of a turning movement of an eyeball is defined by an intersecting point between a light receiving axis orthogonal to a light receiving surface of said light receiving element and said light receiving surface, either said test lens or said light receiving system is constructed so that it can turn around said center of a turning movement, and said projection system is provided with a prism compensator for obtaining a measuring beam equal to that obtained by turning the projection system around said center of turning movement.

10. A lens meter according to claim 9, wherein said projection system is provided with a collimator lens adapted to project said measuring beam as parallel rays onto said test lens with said projection light source located at an infinitely remote position.

11. A lens meter according to claim 10, wherein when said test lens is a progressive lens and a near-sight portion is to be measured, at least one of said collimator lens and said projection light source is moved in the direction of an optical axis of said projection system for projecting said measuring beam onto the test lens with the projection light source located at a finite distance from the test lens.

12. A lens meter according to claim 9, wherein when said test lens is a progressive lens and a near-sight portion is to be measured, an auxiliary lens is inserted into said projection system for projecting said measuring beam as a divergent beam onto the test lens.

13. A lens meter according to claim 9, wherein a prism quantity of said test lens is determined on the basis of a turning angle of said prism compensator.

* * * * *

UNITED STATES PATENT AND TRADEMARK OFFICE
CERTIFICATE OF CORRECTION

PATENT NO. : 6,145,989
DATED : November 14, 2000
INVENTOR(S) : Yukio IKEZAWA, et al.

It is certified that error appears in the above-identified patent and that said Letters Patent is hereby corrected as shown below:

On the title page, item [73] the Assignee's name is incorrect, item [73] should read as follows:

--[73]  Assignee:  Kabushiki Kaisha TOPCON, Tokyo, Japan--

Signed and Sealed this

Twenty-ninth Day of May, 2001

*Attest:*

NICHOLAS P. GODICI

*Attesting Officer*   *Acting Director of the United States Patent and Trademark Office*